JAMES M. AUSTIN
GALE F. GARVIN
WENDELL KARR-AKE
    INVENTORS

BY
*Robert K. Rhea*
    AGENT

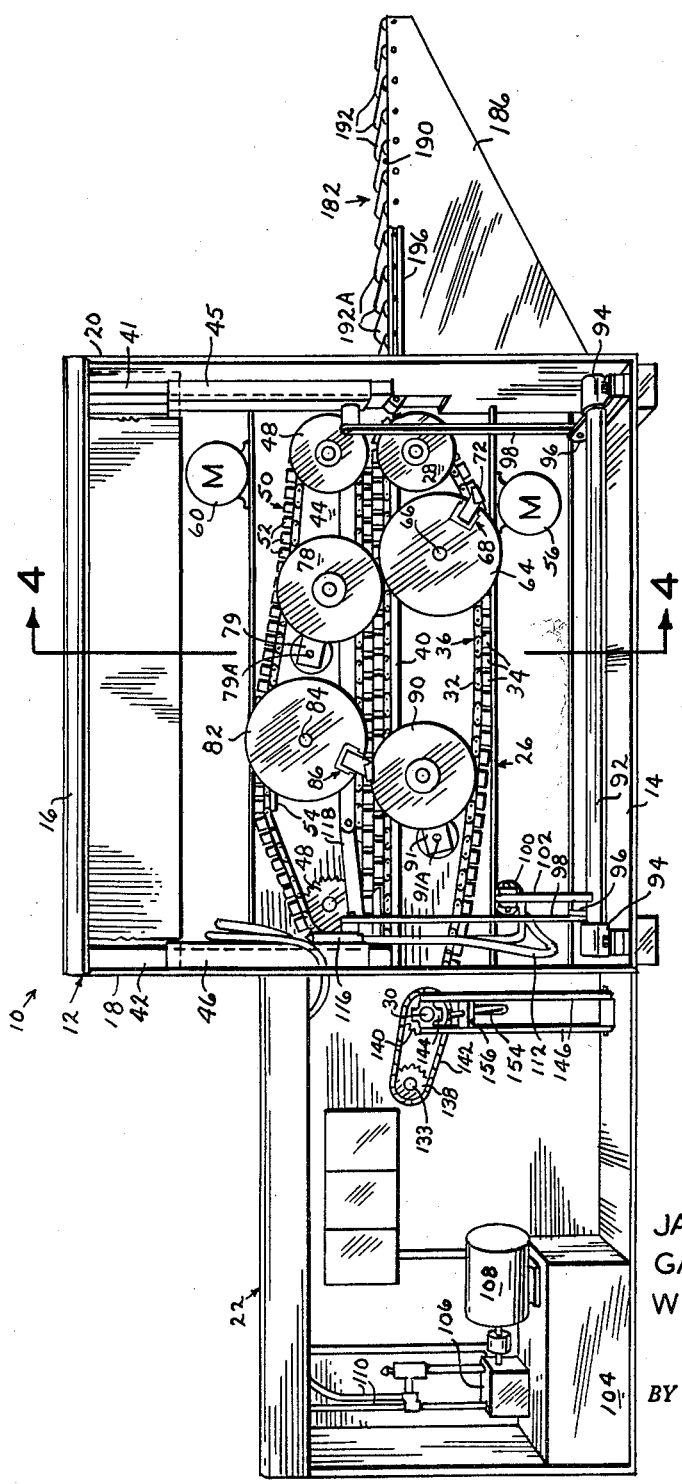

Jan. 15, 1963   J. M. AUSTIN ETAL   3,073,295
STONE FACER

Filed Aug. 14, 1961   5 Sheets-Sheet 5

JAMES M. AUSTIN
GALE F. GARVIN
WENDELL KARR-AKE
*INVENTORS*

BY

*Robert K. Rhea*
AGENT

United States Patent Office 3,073,295
Patented Jan. 15, 1963

3,073,295
STONE FACER
James M. Austin, Gale F. Garvin, and Wendell Karr-Ake, Oklahoma City, Okla., assignors to Southwest Industrial Products, Inc., a corporation of Oklahoma
Filed Aug. 14, 1961, Ser. No. 131,343
16 Claims. (Cl. 125—6)

The present invention relates generally to stone cutting machines and more particularly to a stone facing machine.

When constructing walls, or the like, from stratified stone, particularly an ornamental wall or the wall of a building, it is desirable to form the outwardly disposed surface or face of each stone by chipping or breaking away a portion of this face from opposing upper and lower surfaces thereof so that a selected face edge of each stone will be provided with a pitch surface to project generally outward at its longitudinal central portion from the upper and lower surface thereof wherein the various stones in each course will have a substantial uniform appearance.

The principal object of the instant invention is to provide a machine wherein stratified stone, or the like, may be faced to provide substantial uniformity of appearance.

Another object is to provide a stone facing machine which progressively moves a stone slab placed therein through the machine and automatically chips or breaks away portions of one edge from opposing surfaces defining the edge.

Another object is to provide a machine by which stone slabs may be uniformly positioned before entering the machine for facing and wherein the finished stone is deposited on a roller conveyor for movement away from the facing mechanism and out of the way of the next succeeding stone being faced.

Still another object is to provide a stone facing machine including a stationary stone gripping jaw and an upper co-operating movable stone gripping jaw wherein various thicknesses of stone slabs may be accommodated by the machine.

A further object is to provide a power operated stone facing machine including an upper endless track equipped stone gripping jaw automatically moved into stone gripping position above a stationary endless track equipped stone gripping jaw for progressively moving the stone longitudinally between the gripping jaws for contact with the facing mechanism.

Another important object is to provide a stone facing machine of the class described incorporating a hydraulically operated safety feature which automatically raises the endless track equipped upper movable stone gripping jaw out of contact with any object entering the gripping members of the machine thereby eliminating any danger of the operator being injured by the machine.

Another object is to provide a stone facing machine of this class wherein the stone to be faced is held by resilient means and positioned with respect to the stone facing elements so that the stone will be faced along a selected side edge and along a predetermined line on opposing surfaces of the stone adjacent the edge thereof.

Yet another object is to provide a device of this class which includes a back-up or pressure plate rollably contacting that side of the stone, opposite the stone facing element, which is spring loaded to permit movement of the pressure plate, in the direction of the cutting force, thus permitting movement of the stone away from the cutting force so that a misaligned or inaccurately positioned stone will not be damaged by cutting or breaking at an undesirable location.

An additional object is to provide a device of this class which includes power means for automatically moving the stone into and through the device and which, therefore, requires a minimum amount of effort on the part of the operator.

Still another object is to provide a device of this class by which all edges of a stone may be progressively faced in a desired manner by manually positioning the stone before engagement by the device.

The present invention accomplishes these and other objects by providing an upright frame having opposing parallel posts or support members between which a lower horizontal stone gripping jaw is rigidly positioned and an upper horizontal stone gripping jaw is supported for vertical reciprocating movement. Endless track means supported, respectively, by the stationary and movable jaws co-operatively grip a stone between the lower jaw and the upper jaw when the latter is in lowered position. Co-operating upper and lower stone facing cutters are mounted on each respective stone gripping jaw. Power means rotate the endless tracks and cutter means in synchronization. Conveyors are connected to the respective opposing ends of the frame in co-operative alignment with the meeting surfaces of the endless tracks for moving stone slabs into and beyond the facing mechanism.

Other objects will be apparent from the following description when taken in conjunction with the accompanying five sheets of drawings, wherein:

FIGURE 3 is a perspective view of the rear side of the device;

Like characters of reference designate like parts in those figures of the drawings in which they occur.

In the drawings:

Figure 1:
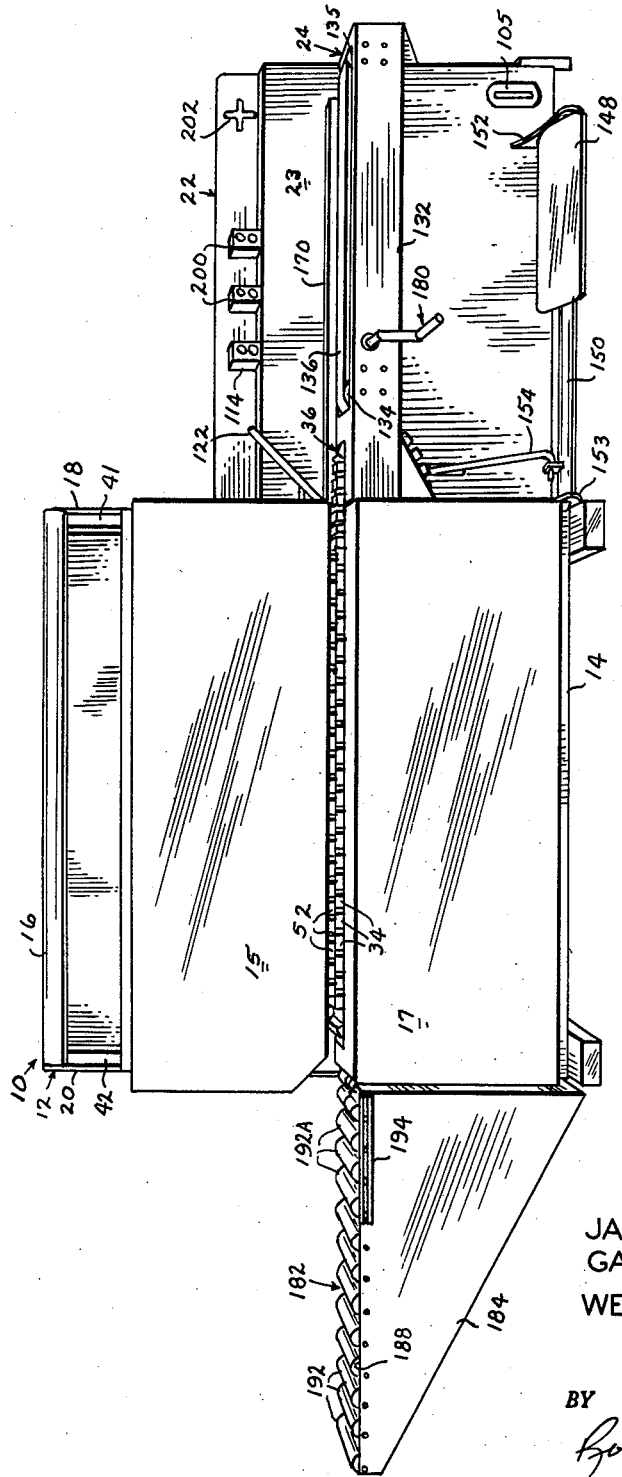
FIGURE 1 is a front side perspective view of the device.

The reference numeral 10 indicates the device, as a whole, comprising an upright frame 12 having horizontal bottom and top members 14 and 16, respectively, interconnected at their opposing ends by spaced-apart parallel forward and rearward posts or support members 18 and 20, respectively. Upper and lower front cover plates 15 and 17, respectively, cover a substantial portion of the device and serve as guards by shielding moving parts. A housing 22 is connected at one end with the outwardly disposed surface of the post 18 and extends outwardly therefrom. A shelf-like stone receiving table or platform 24 is horizontally connected with the forward face 23 of the housing 22 between the upper and lower limits thereof.

Stone Gripping Mechanism

Figures 4, 9:
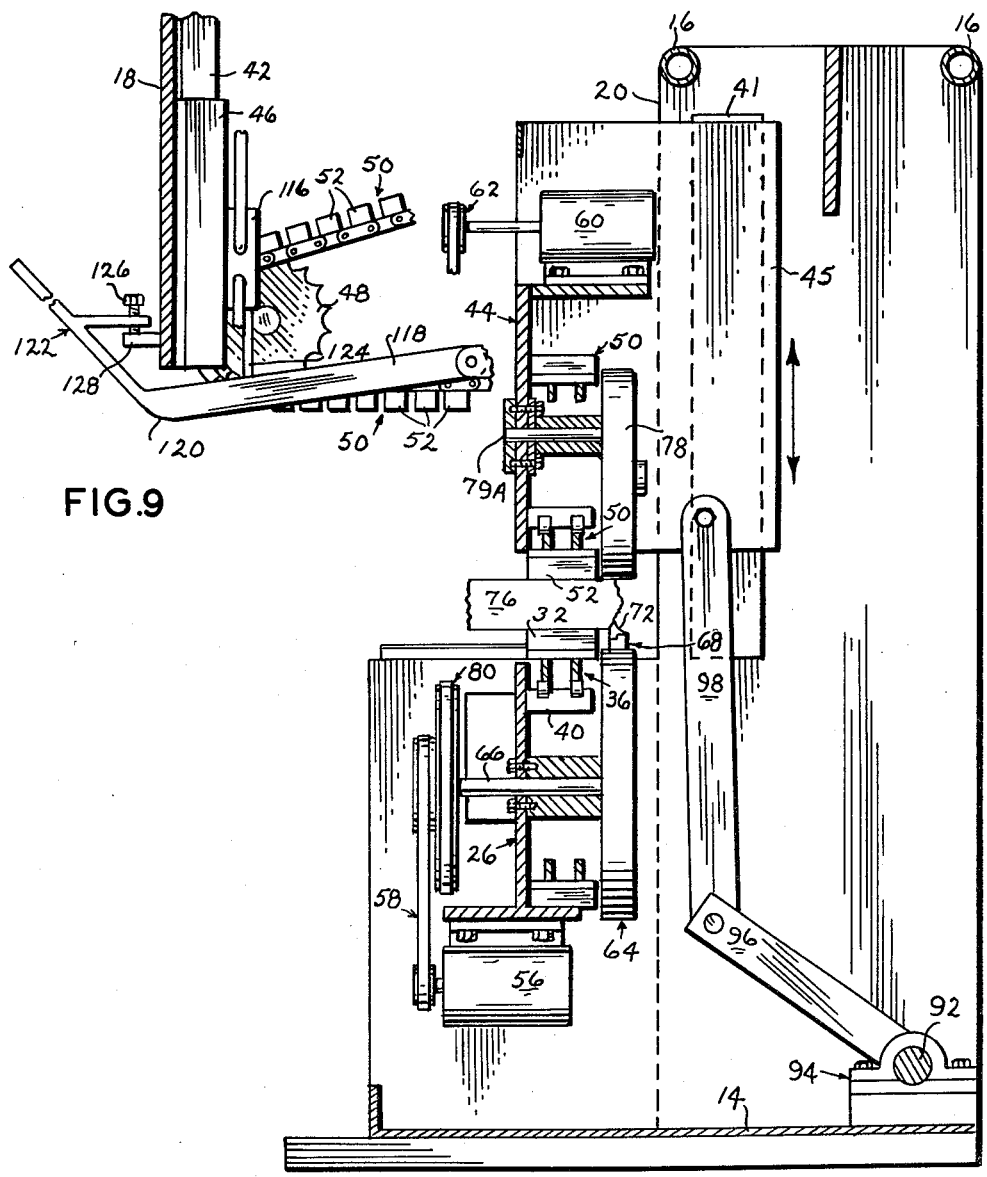
FIGURE 4 is a vertical cross-sectional view, partly in elevation, taken substantially along the line 4—4 of FIG. 3.

An elongated gripping member or jaw 26, substantially inverted T-shape in general configuration, extends horizontally between and is rigidly connected at its opposing ends with the inwardly disposed surfaces of the posts 18 and 20 with the upwardly disposed edge of the jaw lying in the plane defined by the upper surface of the platform 24. A sprocket 28 is mounted adjacent the right hand end portion, as viewed in FIG. 3, on the rearward side of the jaw 26. A similar sprocket, not shown, is aligned with the sprocket 28 and journaled by a shaft 30 supported by the housing 22 (FIG. 3). An endless chain 32 is entrained over these sprockets. Each link of the chain 32 has transversely secured thereto block-like members 34 of a selected length, preferably formed of resilient material, such as hard rubber, or the like, thus forming, with the chain, an endless track 36. A roller equipped horizontal support 40, connected to the rearward side surface of the jaw 26, adjacent its upper edge, supports a portion of the endless track 36 horizontally in spaced parallel relation with respect to the upper limit of the jaw 26 (FIGS. 3 and 4).

A pair of guide members 41 and 42, substantially square in cross section, are rigidly secured to the inwardly disposed surfaces of the posts 18 and 20, respectively. An upper jaw member 44 extends horizontally between and is slidably connected at its opposing ends with the guide members 41 and 42 by a pair of channel members 45 and 46 vertically secured to the respective ends of the jaw 44, which are co-operatingly engaged slidably with the respective guides 41 and 42.

A pair of sprockets 48 are mounted on the rearward surface of the jaw 44 adjacent its respective ends. A second track means 50, identically formed with respect to the track means 36, is entrained over the pair of sprockets 48 so that a horizontally disposed extent of the track 50 has its transverse blocks 52 co-operatively contacting the blocks 34 of the track 36 to form a stone gripping and holding course. A guide 54, (FIG. 3) horizontally secured to the upper portion of the rearward surface of the jaw 44, slidably supports the track 50.

An electric motor 56, mounted in depending relation on the head portion of the inverted T-shaped jaw 26, is drivably connected by belt and pulley means 58 with the sprocket 28 for rotating the track 36. Similarly, a second motor 60 is mounted on the upper jaw 44 and is drivably connected by belt and pulley means 62 to the shaft mounting one sprocket 48 for rotating the track 50. The motors 56 and 60 are synchronized so that the rate of travel of the tracks 36 and 50 are equal.

Figure 5:
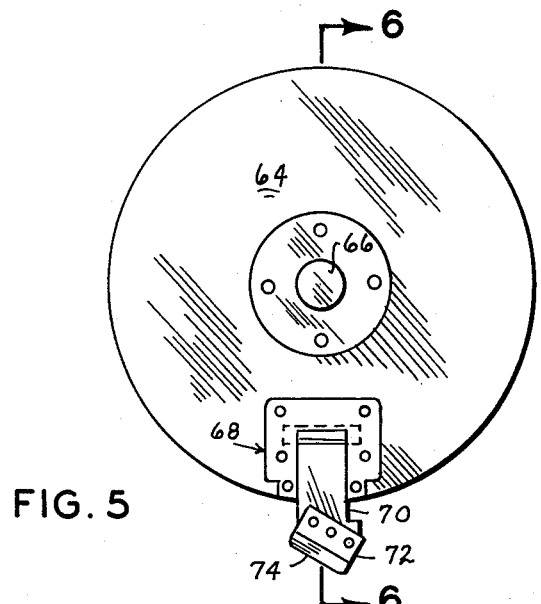
FIGURE 5 is an elevational side view of the stone facing cutter.
Figure 6:
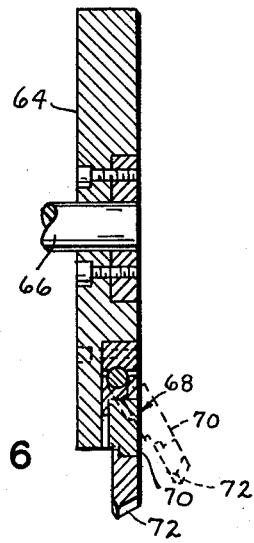
FIGURE 6 is a vertical cross-sectional view, taken substantially along the line 6—6 of FIG. 5, and illustrating, by dotted lines, the movement of the stone facing blade.

A plate-like wheel 64 is mounted on a horizontal axle 66 on the rearward side of the jaw 26. A peripheral portion of the wheel 64 is disposed a selected distance below the horizontal plane defined by the meeting surfaces of the tracks 36 and 50. Stone cutting means 68, comprising a substantially rectangular arm 70, is pivotally mounted by one end portion to the wheel 64, adjacent its outwardly disposed surface, and includes a blade 72, which is secured to the free end of the arm 70. As shown in FIG. 5, the blade 72 is angularly positioned with respect to the longitudinal axis of the arm 70, to position the cutting edge 74 thereof, parallel with respect to the lower surface of a stone slab 76 gripped between the tracks 36 and 50. As shown in FIG. 4, the cutting edge 74 of the blade 72 projects upwardly above the lowermost surface of the stone 76 so that the blade will engage the adjacent edge portion of the stone and cut or break off a small fragment, not shown. When the stone is fractured by the cutter 72, the arm 70 pivots outwardly as shown by dotted lines (FIG. 6) so that the stone is chipped from its lowermost surface rather than breaking the stone through to its uppermost surface. A back-up or pressure wheel 78 is pivotally mounted on the upper jaw 44 by an arm 79, pivotally connected by an axle 79A in lateral off-set relation with respect to the axis of the pressure wheel 78 and in face to face alignment with the wheel 64. The periphery of the pressure wheel 78 contacts, in rolling relation, the upper surface of the stone 76, opposite the cutting means 68, to prevent upward movement of the stone 76 when the blade 72 forceably contacts the stone. The wheel 78 is spring loaded to constantly urge it downwardly against a stone and so that if a stone is inadvertently mis-positioned between the tracks 36 and 50, so that its edge to be faced extends too far toward the rearward side of the machine, contact of the cutting means 68 with the stone will lift the spring loaded wheel 78 and prevent undesired cutting or breaking of the stone. The wheel 64 is driven by a belt and pulley means 80 connected with the motor 56. The wheel 64 is rotated at a rate with respect to the travel of the stone through the machine so that the cutting blade 72 slightly overlaps its previous cut or chip position thus insuring that the downwardly disposed edge portion of the stone is provided with a continuous desired chipped face of configuration.

A similar plate-like wheel 82 is similarly mounted on a horizontal axle 84 extending through the upper jaw 44. As shown in the drawings the wheel 64 is mounted toward the rearward end portion of the lower jaw 26 while the wheel 82 is mounted toward the forward end portion of the upper jaw 44. Obviously these wheel positions may be reversed if desired. The wheel 82 is provided with stone cutting or chipping means 86, similar to the cutting means 68, and similarly mounted on the wheel 82. The wheel 82 is similarly connected with and driven by the motor 60 by belt and pulley means 88. A spring loaded back-up or pressure wheel 90, similar to the pressure wheel 78, is similarly mounted by an arm 91 pivotally connected by an axle 91A to the rearward surface of the lower jaw 26 for co-operatively contacting, in rolling relation, the lower surface of the stone opposite the cutting means 86.

Hydraulic Control Means

Figure 2:
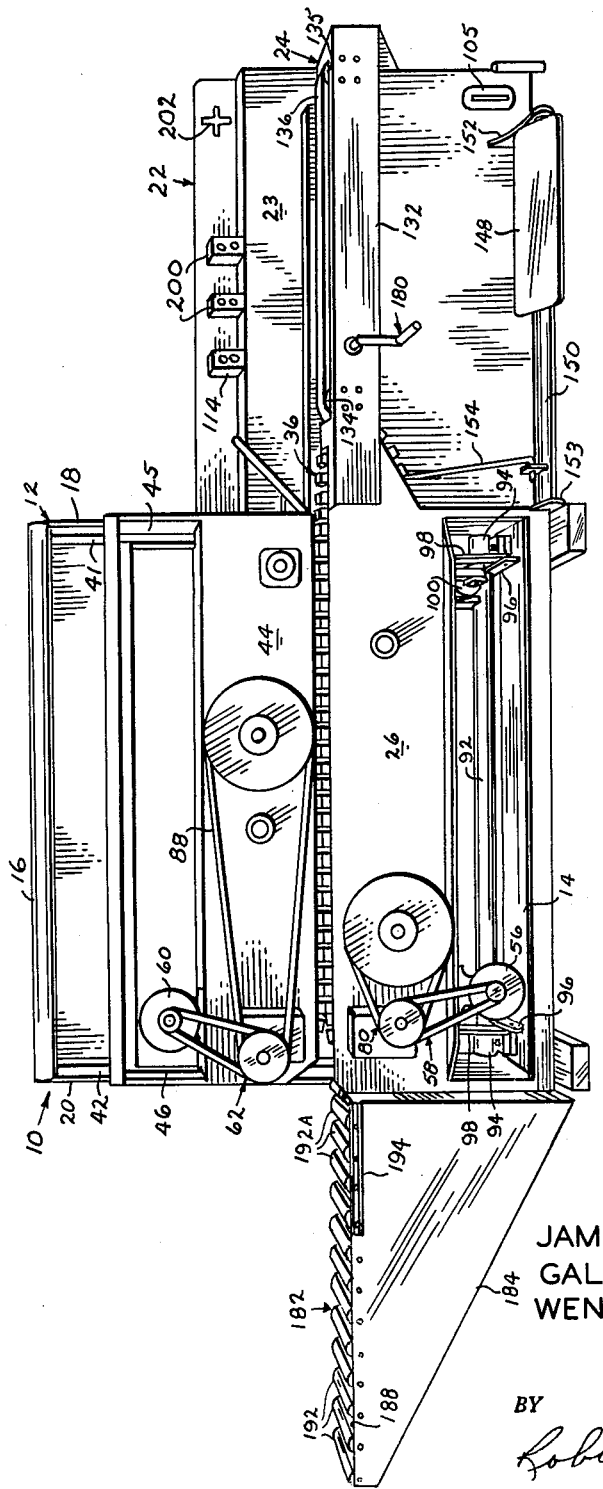
FIGURE 2 is a view similar to FIG. 1 with the front side cover plates removed.

A shaft 92 is journaled at its opposing end portions by bearings 94 connected to the upper surface of the base 14. A pair of arms 96 are connected to the respective end portions of the shaft 92 and extend laterally therefrom in parallel spaced relation. A pair of links 98 are connected by one end portion to the free end portion of each respective arm 96. The other end of each link 98 is pivotally connected to the depending end portion of the channel members 45 and 46, respectively. A hydraulic cylinder 100 is connected at one end with the lower surface of the lower jaw 26 (FIG. 2). The other end of the cylinder 100 is connected to the upstanding end of a control arm 102 rigidly connected to the shaft 92 whereby actuation of the hydraulic cylinder, moving the control arm 102, pivots the shaft 92 thus raising or lowering the arms 96, links 98 and raises or lowers the upper jaw 44 to a selected position.

A hydraulic fluid reservoir 104 is mounted within the housing 22 on the rearward side of the wall 23 and supports a hydraulic pump 106 drivably connected with a motor 108 controlled by a switch 114. Conduits 110, connected with flexible tubing 112, supply hydraulic fluid under pressure to the cylinder 100 for raising and lowering the upper jaw 44 as is explained more fully hereinbelow. A sight fluid gauge 105 is mounted on the forward side of the housing wall 23, and indicates the level of fluid within the reservoir 104.

Referring more particularly to FIG. 9, a hydraulic control valve 116 is mounted on the inwardly disposed surface of the channel 46 adjacent the post 18. An upper jaw lifting control lever 118 is rigidly mounted at one end to the rearward surface of the upper jaw 44 and extends toward the table 24 below the post 18 where the lever is arcuately curved upwardly, as at 120, to provide a handle portion 122 extending angularly upward forwardly of the post 18.

Stone Positioning Means

A control rod 124 extends between and is connected at its respective ends to the lever 118 and the control valve 116 so that upward movement of the lever 118 actuates the valve 116 to apply fluid pressure to the hydraulic cylinder 100 to lift the upper jaw 44. An adjusting screw 126, connected to the angular or handle portion 122 of the lever, adjustably contacts a stop 128 secured to the post 18 for positioning the lever 118 at the desired elevation.

Figure 7:
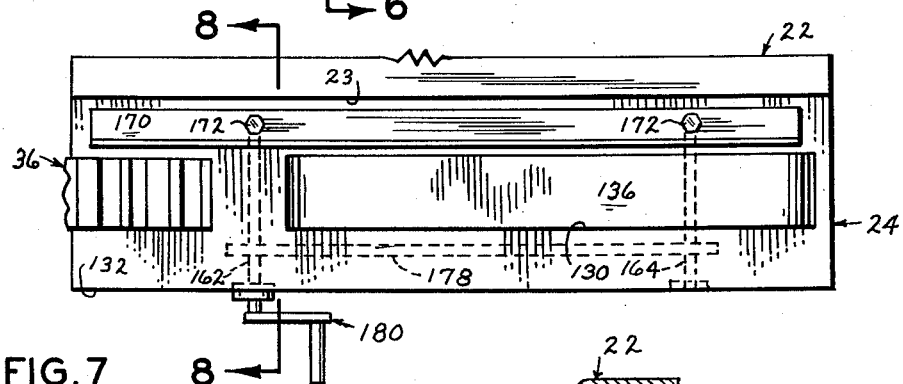
FIGURE 7 is a fragmentary top view of the stone positioning and conveying means.
Figure 8:
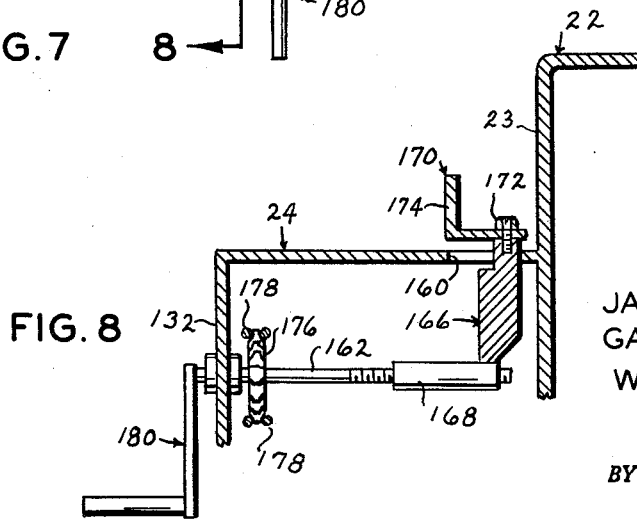
FIGURE 8 is a vertical cross-sectional view taken substantially along line 8—8 of FIG. 7; and, FIGURE 9 is a fragmentary rear side elevational view, partly in cross section, illustrating the hydraulically operated stone actuated upper jaw lifting control.

The upper surface of the table or shelf 24 has a rectangular aperture 130 formed therethrough which extends longitudinally of the shelf and is transversely substantially equal in width to the width of the track means 36 (FIG. 7). The shelf 24 is provided with a forward depending skirt portion 132 and a pair of pulleys 134 and 135 are journaled between the skirt and the vertical wall 23 forming a part of the housing 22. A peripheral portion of each of the pulleys 134 and 135 extend slightly upwardly through the aperture 130 above the plane defined by the upper surface of the shelf 24 adjacent the respective ends of the aperture 130. An endless belt 136 is entrained over the pulleys 134 and 135. The shaft 133 of the pulley 134 extends beyond the vertical wall of the housing 22 and is connected with a sprocket 138 (FIG. 3). A similar sprocket 140 is connected to the shaft 30 which is driven by the track means 36. An endless chain 142 is entrained around the sprockets 138 and 140. Manually operated clutch means 144, pivotally mounted in the housing 22 by a pair of supporting arms 146, connects the sprocket 140 to the shaft 30. A foot controlled treadle plate 148 is secured to a shaft 150 which is pivotally mounted horizontally at its opposing ends between brackets 152 and 153 connected to the forward surface of the housing wall 23 adjacent its lower edge (FIGS. 1 and 2). A control rod 154 is pivotally connected by one end portion to the shaft 150 and extends angularly and upwardly through a suitable opening in the housing wall 23 and is threadedly connected adjacent its other end portion to the clutch supports 146 by a cross piece 156 whereby the treadle 148 may be manually tilted to rotate the shaft 150 about its longitudinal axis, moving the control rod 154 and clutch supporting arms 146, and thus engage or release the clutch 144. When the clutch is engaged, the sprocket 140 rotates the sprocket 138 and moves the endless belt 136 toward the exposed portion of the endless track 36 for conveying stone to be faced, not shown, toward the track 36. Disengaging the clutch 144 stops rotation of the belt 136. The shelf 24 is provided with an elongated opening or slot 160 adjacent the vertical wall 23 of the housing 22 (FIG. 8). The slot 160 extends longitudinally of the shelf 24 the full length of the endless belt 136 and extends in parallel spaced relation beyond the adjacent end portion of the endless track 36 toward the post 18. A pair of guide rods 162 and 164 are journaled at one end by the skirt portion 132 and project inwardly toward the housing 22 in parallel spaced relation. An upstanding support 166, having a sleeve portion 168, is threadedly connected by the sleeve portion 168 to the inwardly directed end portions of the guide rods 162 and 164. The upstanding supports 166 project upwardly above the shelf 24 through the rectangular opening 160 and are connected to a right angular guide 170 by bolts 172. One flanged edge 174 of the guide 170 is vertically positioned perpendicular with respect to the upper surface of the shelf 24 for the purposes which will readily be apparent.

A pair of sprockets 176, one of which is shown in FIG. 8, are secured to the guide rods 162 and 164 in aligned relation for receiving a chain 178, or the like, entrained therearound. Control means 180 is connected with the end of the guide rod 162 projecting outwardly of the skirt 132 for rotating the guide rods 162 and moving the guide member 170 toward or away from the vertical wall of the housing 22. A disk-like wheel, not shown, may be substituted for the handle control means 180, if desired.

Discharge Conveyer Means

Roller conveyer means 182 is connected to the end of the frame 12 opposite the housing 22. The roller conveyer includes a pair of side members 184 and 186 joined to the post 20 and extending outwardly therefrom in parallel spaced relation with an upper horizontal edge 188 and 190 of the respective side member substantially aligned with the plane defined by the meeting surfaces of the endless tracks 36 and 50. A plurality of rollers 192 are horizontally journaled between the upper edge portions of the side members 184 and 186 for receiving and rollably conveying the faced stone, not shown, as it is discharged from between the tracks. The rollers 192A, adjacent the post 20, are slidably mounted with respect to the side members 184 and 186 by track-like guides 194 and 196 so that these rollers may be moved longitudinally of the conveyer supports. Spring means, not shown, connected with the rollers 192A, normally maintain the latter in their desired position for the purposes more fully explained hereinbelow.

Operation

In operation conventional conveyer means, not shown, positioned against the right hand end of the shelf 24, as seen in FIGS. 1 and 2, positions the stone to be faced adjacent the shelf 24. The motors 56 and 60, are connected with a source of electrical energy, not shown, through control switches 200 mounted on the housing wall 23. The operator closes the switches 114 and 200, which starts the motors 108, 56 and 60, and then tilts the treadle 148 to operate the endless belt 136, as explained hereinabove, to position a stone, not shown, intermediate the ends of the belt. The guide rail 170 is adjusted laterally of the table 24 in accordance with the general contour or configuration of the stone slabs to be faced and in a desired parallel alignment with the endless tracks 36 and 50. The edge of the stone to be faced is manually positioned against the guide 170 and the treadle 148 tilted to actuate the belt 136 and move the stone toward the adjacent end of the revolving track 36. The track 36 moves the stone into contact with the hydraulic valve control lever 122 which actuates the valve 116 and in turn operates the hydraulic cylinder 100 to lift the upper jaw 44 and track 50 out of contact with the stone. As the stone is progressively moved under and beyond the lever 118, hydraulic fluid pressure returns the upper jaw downwardly so that the track 50 co-operates with the track 36 in gripping the upper and lower surfaces of the stone 76 (FIG. 4). A hydraulic fluid pressure control valve 202, mounted on the housing 22 and connected with the hydraulic fluid conduits 110, is manually adjusted to regulate the pressure applied to the cylinder 100 to maintain a desired grip on the stone 76 by the tracks 36 and 50. As the stone 76 is progressively moved between the jaws 26 and 44 in a direction longitudinally of the jaws, the cutter means 86, driven by the motor 60, chips a continuous edge surface off the stone in cooperation with the pressure wheel 90. As the stone 76 is moved further between the jaws, the cutting means 68, driven by the motor 56, performs a similar stone facing or cutting of the lower edge of the stone in co-operation with the pressure wheel 78. After the stone has been faced, the tracks 36 and 50 discharge the stone onto the discharge conveyer 182. If for any reason the stone should not be conveyed outwardly of the machine by the rollers 192A as, for example, by the stone lodging against one of the rollers, succeeding stones, after being faced, coming in contact with the stone lodged on the rollers 192A will overcome the resistance of the springs, connected with the rollers 192A, so that the stone will be moved outwardly of the machine, with the slidably mounted rollers 192A, rather than piling up at the discharge end of the tracks 36 and 50 and preventing the latter gripping the next succeeding stone to be faced. Obviously the stone may be faced on other opposing edge surfaces thereof as desired by returning the stone by a conveyer or other means to the shelf 24. At any time a stone is mis-positioned, or if for any other reason it is desired to quickly raise the upper jaw 44, the operator need only manually raise the hydraulic control valve handle 122 which actuates the cylinder 100 through the valve 116 and lifts the upper jaw 44 and track 50 out of contact with the track 36.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A stone facing machine of the class wherein an upper jaw and a lower jaw is provided between which a stone to be faced is moved and disposed, said jaws having co-operating surfaces in confronting relationship and in substantially the same plane for engagement with the top and bottom surfaces of the stone; endless track means mounted on each of said jaws in co-operative contact between the adjacent meeting edges of said jaws for gripping and progressively moving the stone to be faced longitudinally between said jaws; stone facing means mounted on and at one side of each said jaw; power means connected with said upper jaw for adjusting the latter in stone receiving and engaging position; and a motor mounted on each said jaw and drivably connected with the respective said stone cutting means and the respective said endless track for moving the latter and a stone being faced at a predetermined rate with respect to the stone facing action of said stone facing means.

2. Structure as specified in claim 1 in which the stone facing means includes a disk-like wheel journaled by the respective said jaw in parallel spaced relation with respect to the adjacent side surface of the latter; a stone cutting blade pivotally mounted to said disk-like wheel and projecting beyond a peripheral portion thereof defining a line of fracture adjacent the edge of a stone to be faced; and a pressure plate journaled by the respective said jaw in co-operative face to face alignment with the respective disk-like cutting wheel and rollably contacting the surface of a stone to be faced opposite said cutting blade.

3. Structure as specified in claim 1 in which said power means includes a hydraulic cylinder mounted on said lower jaw and connected with said upper jaw for raising and lowering the latter; and hydraulic pump means connected with said hydraulic cylinder.

4. A stone facing machine, including: a base; a pair of upright posts connected to opposing ends of said base; a lower horizontal support extending between said supports; an upper horizontal support extending between said upright supports and slidably connected therewith for vertical reciprocating movement; a sprocket mounted for rotation about a horizontal axis adjacent each end portion of said upper and lower horizontal supports; upper and lower endless track means entrained over the respective sprockets on said upper and lower horizontal supports; motor means drivably connected with one said sprocket on each respective said upper and lower horizontal support for rotating said endless tracks in one direction; power means connected with said upper support for raising and lowering the latter; a wheel rotatably mounted at one side of each said upper and lower horizontal support and drivably connected with said motor means; stone cutting means mounted on each said wheel; and a pressure plate mounted on each said upper and lower horizontal support in co-operative face to face aligned relation with the respective said wheel and rollably contacting the surface of said stone opposite said wheel.

5. Structure as specified in claim 4 in which said power means includes bearings mounted on said base; an elongated shaft journaled by said bearings; an arm connected at one end to said shaft and projecting laterally of the latter; a link extending between the other end portion of said arm and said upper horizontal support and connected therewith; an upstanding lever connected with said shaft; a hydraulic cylinder mounted on said lower horizontal support and connected with the free end portion of said upstanding lever; and hydraulic pump means connected with said hydraulic cylinder.

6. A stone facing machine, comprising: an upright frame including a pair of parallel spaced-apart posts; a fixed jaw extending horizontally between and secured to said posts; a movable jaw extending between and connected at its opposing ends with said posts for vertical reciprocating movement above said fixed jaw; hydraulic power means connected with said movable jaw for raising and lowering the latter; endless track means mounted upon each said jaw in co-operating relation for gripping and progressively moving a stone to be faced in a longitudinal direction between said jaws; guide means positioned at one end of said frame in cooperative alignment with the horizontal plane defined by the meeting surfaces of said endless track means for positioning a stone to be faced prior to its being gripped by the co-operative surfaces of said endless track means; stone facing means mounted on each said jaw and positioned with respect to the stone to be faced for engagement with opposing surfaces of the latter; and motor means mounted on each said jaw and drivably connected with the respective said endless track means and said stone edge cutting means.

7. Structure as specified in claim 6 in which said endless track means includes a pair of sprockets mounted on each said jaw adjacent the respective ends thereof; a chain entrained over the respective pair of sprockets on each said jaw; and resilient gripping blocks transversely secured in spaced-apart relation to each said chain.

8. Structure as specified in claim 6 in which said guide means includes a housing connected with one end of said frame; a horizontal shelf connected with said housing; a guide rail extending longitudinally of said shelf; and crank means connected with said guide rail for adjustably positioning the latter transversely of said shelf.

9. Structure as specified in claim 8 and an endless belt mounted on said shelf adjacent said guide rail; clutch means connected with said endless track means on said lower jaw and drivably connected with said endless belt; and a treadle connected with said clutch for engaging and releasing the latter and moving said endless belt.

10. Structure as specified in claim 6 in which the stone facing means includes a disk-like wheel journaled by the respective said jaw in parallel spaced relation with respect to the adjacent side surface of the latter; a stone cutting blade pivotally mounted on said disk-like wheel and projecting beyond a peripheral portion thereof defining a line of fracture adjacent the edge of a stone to be faced; and a pressure plate journaled by the respective said jaw in co-operative face to face alignment with the respective disk-like cutting wheel and rollably contacting the surface of a stone to be faced opposite said cutting blade.

11. A stone facing machine, including: an upright frame, said frame including spaced-apart vertical support posts; a lower stationary jaw extending horizontally between and secured at its opposing ends to said posts; an upper jaw extending horizontally between and slidably mounted on said posts for vertical reciprocating movement; a sprocket journaled by said upper and lower jaws adjacent their respective ends; endless track means entrained over said sprockets on each said jaw, said track means forming a stone gripping passageway between said upper and lower jaws; a motor mounted on said upper and said lower jaw and drivably connected with one said sprocket on each said jaw for simultaneously rotating said track means; a cutter wheel mounted on said upper and said lower jaw and positioned adjacent the edge of a stone to be faced when held by said track means; cutter means connected with each said cutter wheel and projecting beyond the periphery thereof for contacting the adjacent respective upper or lower surface of the stone to be faced; belt and pulley means connected with the respective said motor for rotating the cutter wheels at a predetermined rate with respect to the rate of travel of the stone so that the cutter means overlaps a portion of each previous cutting position to form a continuation of the cutting line; a hydraulic cylinder mounted within said frame and connected with said upper jaw for raising and lowering the latter; a hydraulic fluid pressure pump connected with said hydraulic cylinder for actuating the latter; and guide means connected with said frame for positioning and moving stone toward said track means.

12. Structure as specified in claim 11 in which said guide means includes a housing connected with one end of said frame; a horizontal shelf connected with said housing; a guide rail extending longitudinally of said shelf; and crank means connected with said guide rail for adjustably positioning the latter transversely of said shelf.

13. Structure as specified in claim 12 and an endless belt mounted on said shelf adjacent said guide rail; clutch means connected with said endless track means on said lower jaw and drivably connected with said endless belt; and a treadle connected with said clutch for engaging and releasing the latter and moving said endless belt.

14. A stone facing machine, comprising: an upright frame, said frame including a base member and a head member interconnected in spaced-apart relation by a pair of spaced-apart vertical support posts; a lower horizontal jaw extending between and secured to said posts; an upper jaw extending horizontally between and slidably mounted on said posts for vertical reciprocating movement toward and away from said lower jaw; a sprocket mounted adjacent each end portion of said upper and lower jaws; an endless chain entrained around said sprockets on each respective jaw; gripping blocks transversely secured to the outwardly disposed surface of each said endless chain for forming a horizontal course extending longitudinally between said jaws for gripping and progressively moving a stone to be faced longitudinally of said frame; a motor mounted on each said jaw; belt and pulley means connecting each said motor with one sprocket on each said jaw for moving said chains; stone cutting means mounted on each said jaw, said stone cutting means comprising a disk-like wheel and an arm pivotally mounted on one side surface of each said disk-like wheel and projecting outwardly of the periphery thereof, a blade secured in angular relation to the free end portion of each said arm to define a continuous line of fracture on a stone being faced; a pressure plate pivotally mounted by each said jaw and aligned with the respective cutter means for continuously contacting, in rolling relation, the surface of a stone to be faced opposite the cutting means; a shaft rotatably mounted on said base within said frame; a pair of arms secured to said shaft and projecting laterally therefrom in spaced parallel relation; a pair of links connected with the free end portion of said arms and connected at their other ends with said upper jaw; an upstanding lever connected with said shaft; a hydraulic cylinder mounted on said lower jaw and connected with the free end portion of said lever; hydraulic pump and conduit means connected with said hydraulic cylinder for moving said lever and raising and lowering said upper jaw; a hydraulic valve mounted on one said post and connected with said hydraulic pump; a control lever pivotally mounted on said upper jaw and connected with said hydraulic valve for actuating said hydraulic valve and lifting said upper jaw when said control lever is contacted by a stone to be faced; guide means connected with said frame for positioning a stone to be faced and moving the latter toward said hydraulic control lever; and a discharge conveyor connected with the end of said frame opposite the guide means.

15. Structure as specified in claim 14 in which said guide means includes a housing connected with one end of said frame; a horizontal shelf connected with said housing; a guide rail extending longitudinally of said shelf; and crank means connected with said guide rail for adjustably positioning the latter transversely of said shelf.

16. Structure as specified in claim 15 and an endless belt mounted on said shelf adjacent said guide rail; clutch means connected with said endless track means on said lower jaw and drivably connected with said endless belt; and a treadle connected with said clutch for engaging and releasing the latter and moving said endless belt.

References Cited in the file of this patent

UNITED STATES PATENTS

| | | |
|---|---|---|
| 1,877,269 | Colgren | Sept. 13, 1932 |
| 2,723,657 | Jones | Nov. 15, 1955 |
| 2,801,626 | Potter et al. | Aug. 6, 1957 |
| 2,867,204 | Arvay | Jan. 6, 1959 |